US011153478B2

United States Patent
Tanaka et al.

(10) Patent No.: US 11,153,478 B2
(45) Date of Patent: Oct. 19, 2021

(54) IMAGE PROCESSING DEVICE

(71) Applicant: OLYMPUS CORPORATION, Hachioji (JP)

(72) Inventors: Yoshinobu Tanaka, Tokyo (JP); Atsushi Ishihara, Tokyo (JP); Yutaka Murata, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/136,311

(22) Filed: Dec. 29, 2020

(65) Prior Publication Data
US 2021/0120173 A1 Apr. 22, 2021

Related U.S. Application Data

(63) Continuation of application No. PCT/JP2018/026168, filed on Jul. 11, 2018.

(51) Int. Cl.
*H04N 5/232* (2006.01)
(52) U.S. Cl.
CPC ..... *H04N 5/23227* (2018.08); *H04N 5/23229* (2013.01)
(58) Field of Classification Search
CPC . H04N 5/23227; H04N 5/23229; H04N 5/378
See application file for complete search history.

(56) References Cited

U.S. PATENT DOCUMENTS

| | | | | |
|---|---|---|---|---|
| 7,657,775 B1* | 2/2010 | Wagner | ............... | G06F 1/324 713/501 |
| 7,755,381 B1* | 7/2010 | Alfke | ............... | H03K 19/00361 326/21 |
| 9,299,415 B1* | 3/2016 | Asbury | ............... | G11C 11/4076 |

(Continued)

FOREIGN PATENT DOCUMENTS

| | | |
|---|---|---|
| JP | 5-130617 A | 5/1993 |
| JP | 2004-013820 A | 1/2004 |

(Continued)

OTHER PUBLICATIONS

International Search Report dated Sep. 25, 2018, issued in counterpart application No. PCT/JP2018/026168, w/ English translation (2 pages).

*Primary Examiner* — Hung H Lam
(74) *Attorney, Agent, or Firm* — Westerman, Hattori, Daniels & Adrian, LLP

(57) ABSTRACT

An image processing device includes: an image sensor; a data buffer; an imaging interface part configured to read image data from the image sensor, generate an imaging signal, and write the generated imaging signal to the data buffer; an imaging processor configured to read out the imaging signal written in the data buffer and perform image processing; a synchronization signal generator configured to generate a synchronization signal synchronized with the image sensor; and a clock frequency controller configured to control a clock frequency of a clock input to the imaging processor on the basis of the synchronization signal, wherein the clock frequency controller is configured to change the clock frequency after a start of a valid period of the synchronization signal.

10 Claims, 7 Drawing Sheets

(56) References Cited

U.S. PATENT DOCUMENTS

| | | | | |
|---|---|---|---|---|
| 10,389,956 B2* | 8/2019 | Kim | ...................... | H04N 5/378 |
| 2007/0208964 A1* | 9/2007 | Sandon | .................... | G06F 1/08 |
| | | | | 713/501 |
| 2016/0077459 A1* | 3/2016 | Miyadera | ............. | G03G 15/043 |
| | | | | 347/118 |
| 2017/0118379 A1* | 4/2017 | Saga | ...................... | H04N 1/504 |
| 2019/0319629 A1* | 10/2019 | Lee | ........................ | G11C 7/222 |

FOREIGN PATENT DOCUMENTS

| | | |
|---|---|---|
| JP | 2005-339310 A | 12/2005 |
| JP | 2006-246077 A | 9/2006 |

\* cited by examiner

IMAGE PROCESSING DEVICE

CROSS REFERENCE TO RELATED APPLICATIONS

This application is a continuation application based on a PCT Patent Application No. PCT/JP2018/026168, filed on Jul. 11, 2018, the entire content of which is hereby incorporated by reference.

BACKGROUND OF THE INVENTION

Field of the Invention

The present invention relates to an image processing device.

Description of the Related Art

As a method for reducing the power consumption of an LSI, it is common practice to stop the circuit during a period when it is not in operation. In this method, the current changes abruptly when switching from the circuit stopped state to the circuit operating state and from the circuit operating state to the circuit stopped state, and the accompanying voltage fluctuation becomes a problem. This is because if the voltage value deviates from the circuit operating range, malfunction may occur.

FIG. 13 is a block diagram showing a configuration of a general image processing device. The image processing device includes an image sensor (imaging element) 1, an imaging part 2, an image processor 3, a display part 4, a display device 5, a DRAM 6, and a data bus 7. The imaging part 2 includes an imaging interface part (imaging IF part) 21 and an imaging processor 22. The display part 4 includes a display processor 41 and a display interface part (display IF part) 42.

The imaging IF part 21 reads out the data (image signal) obtained by the image sensor 1 and generates an imaging signal. The imaging processor 22 processes the image image signal from the imaging IF part 21 and transmits it to the image processor 3 via the data bus 7. The image processor 3 performs image processing A, B, C, etc. on the data (image processed data) from the imaging part 2. The data image-processed by the image processor 3 is transmitted to the display processor 41 via the data bus 7 to be processed, and transmitted to the display device 5 via the display part IF part 42. Data transmission via the data bus 7 may be via DRAM 6.

The imaging part 2 operates by receiving data (image signal) from the image sensor 1. The imaging part 2 is devised to reduce power consumption, such as stopping the clock outside the valid period (operating period). However, there is a problem of current fluctuation (voltage fluctuation) due to the simultaneous operation of the circuits at the start and end of the valid period.

The data from the image sensor 1 is input to the imaging part 2 in synchronization with the horizontal synchronization signal (HSYNC) and the vertical synchronization signal (VSYNC). In order to reduce power consumption, the clock CLK is generally stopped outside the valid period (operating period). FIG. 14 is a diagram showing the relationship between the synchronization signal (horizontal synchronization signal and vertical synchronization signal) and the validity period. As shown in FIG. 14, a two-dimensional image is read in the horizontal direction from left to right by raster scanning, and is moved from top to bottom to be read. When the reading position enters the valid period, the clock CLK is input to the imaging processor 22.

FIG. 15 is a diagram showing horizontal synchronization signal (HSYNC), vertical synchronization signal (VSYNC), clock CLK, and current fluctuation in FIG. 14. In this example, there are valid periods for 4 lines. The clock CLK is stopped outside the valid period (non-valid period). Therefore, the current fluctuates greatly when switching from the non-valid period to the valid period. That is, in FIG. 14, a sudden current change (rise) occurs at the start time 4a of the valid period, and a sudden current change (fall) occurs at the end time 4b of the valid period.

Next, the LSI in the imaging part 2 will be described. FIG. 16 is a diagram showing an example of voltage fluctuation of the LSI when switching from the circuit stopped state to the circuit operating state and from the circuit operating state to the circuit stopped state according to the prior art. The ENABLE signal indicates ON and OFF of the circuit. The clock CLK is input during the operating period (ON), and the clock CLK is not input during the non-operating period (OFF). Although the expression "LSI in the imaging part 2" is used here, it is not always necessary for the imaging part 2 to have an independent LSI, and the imaging part 2, the image processor 3, the display part 4, and the data bus 7 may be the same LSI.

As shown in FIG. 16, the transient current Ivdd changes abruptly when switching from the circuit stopped state (OFF) to the circuit operating state (ON). That is, since the difference $\Delta i$ between the current flowing during the circuit operating state (ON) and the current flowing during the circuit stopped state (OFF) changes in the short time $\Delta t$, the slope of the transient current Ivdd is steep. When the transient current Ivdd flows on a steep gradient, the voltage cannot catch up with this fluctuation, the power supply voltage VDD drops once, and then the power supply voltage VDD rises once due to the reaction. The fluctuation range of the power supply voltage VDD is $\Delta V$.

The power supply voltage is determined for each LSI, and the operating range is determined in the range of plus or minus several % of it. Therefore, if $\Delta V$ is too large, the LSI will enter a region where the LSI does not operate. The same phenomenon occurs when switching from the circuit operating state (ON) to the circuit stopped state (OFF).

In order to solve the above-mentioned problem, since the height (magnitude) $\Delta i$ of the current change is fixed, it is sufficient to increase $\Delta t$ to make the current change gentle. As a result, the voltage fluctuation accompanying the current change can be suppressed and the voltage level can be stabilized. FIG. 17 is a diagram showing an example of voltage fluctuation of the LSI when switching from the circuit stopped state to the circuit operating state and from the circuit operating state to the circuit stopped state after the above problem is solved. As shown in FIG. 17, when $\Delta t$ is set to about 100 ns, the current change becomes gentle, so that the voltage fluctuation due to the current change can be suppressed and the voltage level can be stabilized.

Japanese Unexamined Patent Application, First Publication No. 2005-339310 (hereinafter referred to as Patent Document 1) discloses a configuration in which the clock frequency is gradually changed from a low frequency to a high frequency at start-up to reduce power fluctuations.

FIG. 18 is a diagram showing clock gating. An AND gate (clock gating) 12 is arranged in front of the flip-flop FF to which a clock is input. The clock is input to the flip-flop FF via clock gating 12. In clock gating, the clock is turned on only during the operating period (valid period). Therefore, even if the clock frequency is changed during the non-operating period (when the clock gating is closed), the power consumed during this period is originally small, and the effect of making the current change gentle is small.

In the case of Patent Document 1, the clock frequency is controlled before the start-up, and the clock frequency is operated after the clock frequency reaches a predetermined frequency. That is, the clock frequency is not controlled during operation, and it is difficult to suppress power supply fluctuations when clock gating is adopted.

The present invention provides an image processing device capable of making the current transition gentle when switching from a non-valid period to a valid period even when clock gating is adopted.

SUMMARY

An image processing device includes: an image sensor; a data buffer; an imaging interface part configured to read image data from the image sensor, generate an imaging signal, and write the generated imaging signal to the data buffer; an imaging processor configured to read out the imaging signal written in the data buffer and perform image processing; a synchronization signal generator configured to generate a synchronization signal synchronized with the image sensor; and a clock frequency controller configured to control a clock frequency of a clock input to the imaging processor on the basis of the synchronization signal. The clock frequency controller is configured to change the clock frequency after a start of a valid period of the synchronization signal.

In the above image processing device, the clock frequency controller may increase the clock frequency stepwise after the start of the valid period of the synchronization signal.

In the above image processing device, the clock frequency controller may once raise the clock frequency and then lower the clock frequency after the start of the valid period of the synchronization signal.

In the above image processing device, the clock frequency controller may change the clock frequency before an end of the valid period of the synchronization signal.

In the above image processing device, the clock frequency controller may gradually lower the clock frequency before the end of the valid period of the synchronization signal.

An image processing device includes: a data buffer; a display processor configured to read data, perform image processing, and write it to the data buffer; a display interface part configured to read the data written in the data buffer and generate a display signal; and a synchronization signal generator configured to generate a synchronization signal; a clock frequency controller configured to control a clock frequency of a clock input to the display processor on the basis of the synchronization signal. The clock frequency controller is configured to change the clock frequency after a start of a valid period of the synchronization signal.

In the above image processing device, the clock frequency controller may increase the clock frequency stepwise after the start of the valid period of the synchronization signal.

In the above image processing device, the clock frequency controller may once raise the clock frequency and then lower the clock frequency after the start of the valid period of the synchronization signal.

In the above image processing device, the clock frequency controller may change the clock frequency before an end of the valid period of the synchronization signal.

In the image processing device, the clock frequency controller may gradually lower the clock frequency before the end of the valid period of the synchronization signal.

According to the image processing device of each aspect of the present invention, it is possible to make the current transition gentle when switching from the non-valid period to the valid period even when clock gating is adopted.

DETAILED DESCRIPTION OF THE PREFERRED EMBODIMENTS

The present invention focuses on a circuit that starts to operate all at once according to a synchronization signal.

In the following explanation, the imaging part that receives the data from the image sensor will be described, but the same technology can be applied to the display part that operates in synchronization with the display device such as a television or a liquid crystal panel. (This initiative includes the contents of the display part.) That is, in the following description, the input data from the image sensor will be used as an example, but the same technique can be applied to the output data to the display device. Further, the operation when switching from the circuit stopped state (OFF) to the circuit operating state (ON) will be described below, but the same applies to the operation when switching from the circuit operating state (ON) to the circuit stopped state (OFF).

Figure 1:
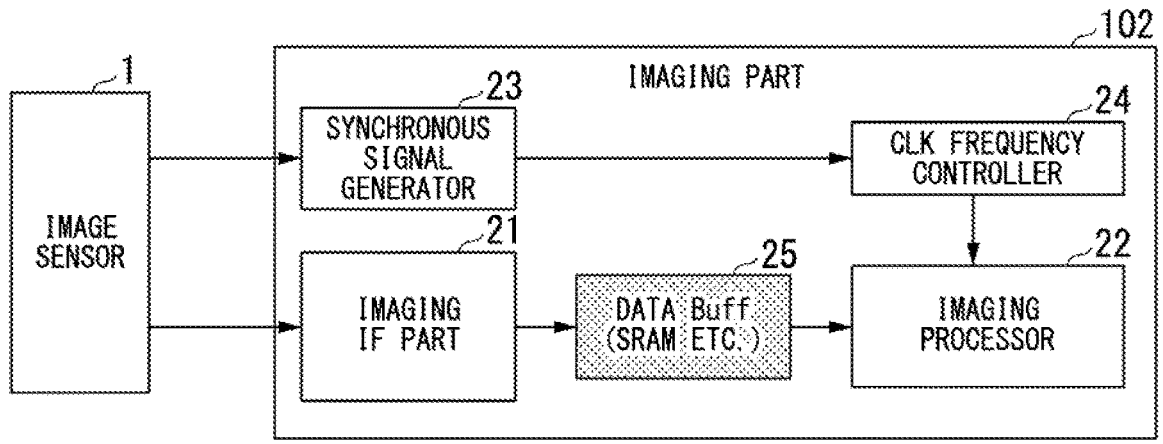
FIG. 1 is a block diagram showing a configuration of an image sensor and an imaging part in the image processing device according to an embodiment of the present invention.
Figure 13:
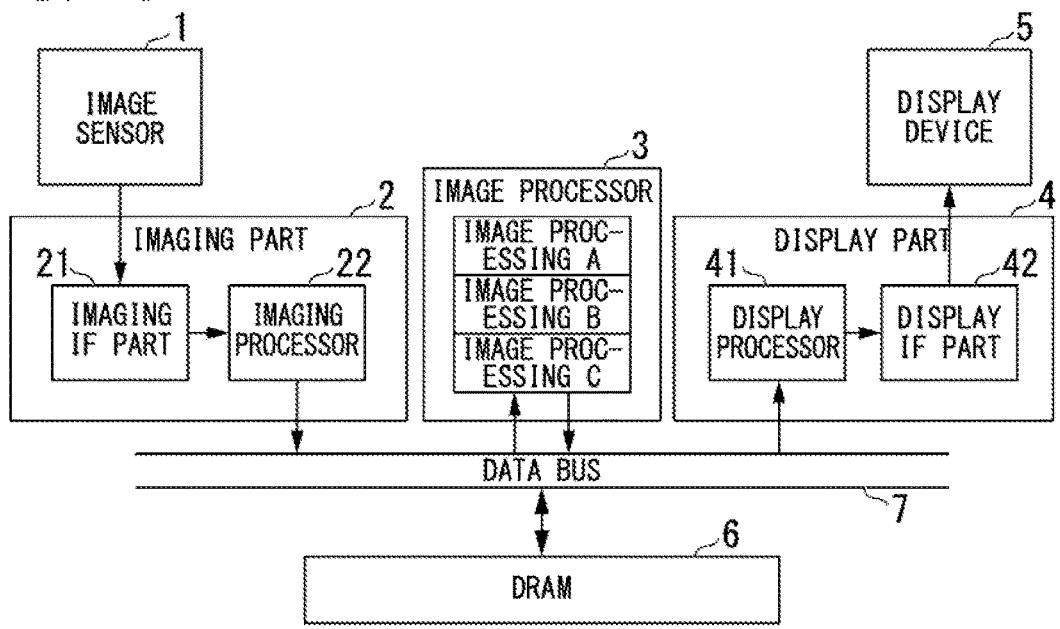
FIG. 13 is a block diagram showing a configuration of a general image processing device.
Figure 14:
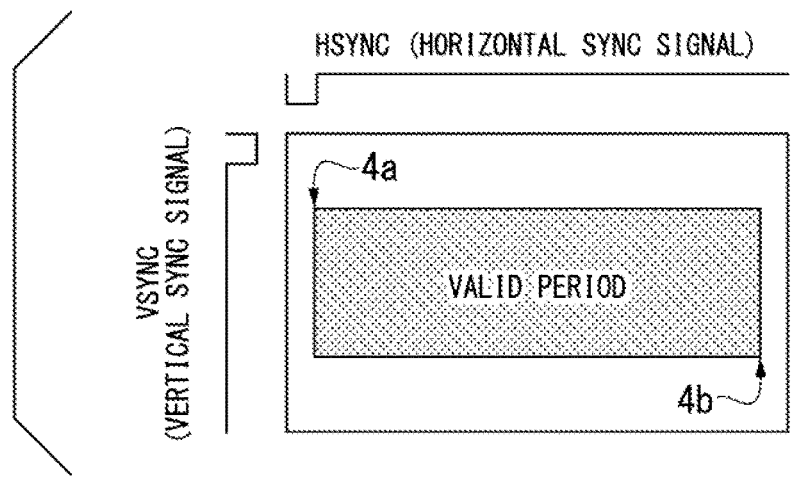
FIG. 14 is a diagram showing a relationship between a synchronization signal (horizontal synchronization signal and vertical synchronization signal) and a valid period.
Figure 15:
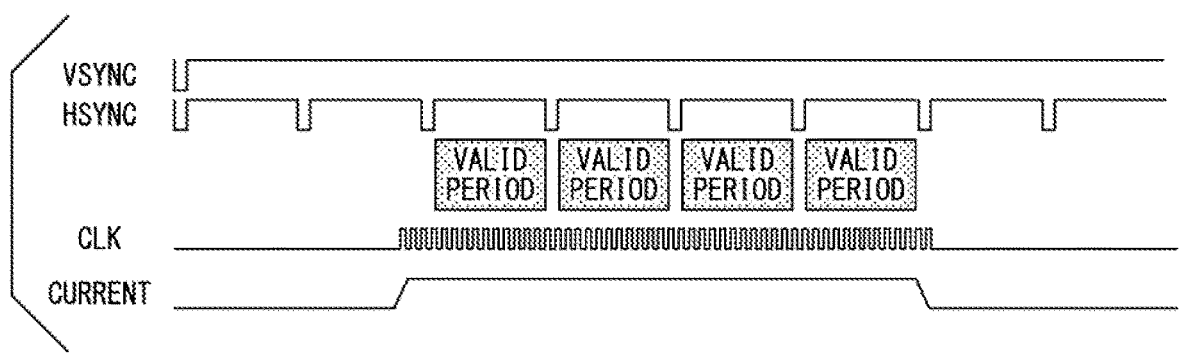
FIG. 15 is a diagram showing a horizontal synchronization signal (HSYNC), a vertical synchronization signal (VSYNC), a clock, and a current fluctuation in FIG. 14.
Figure 16:
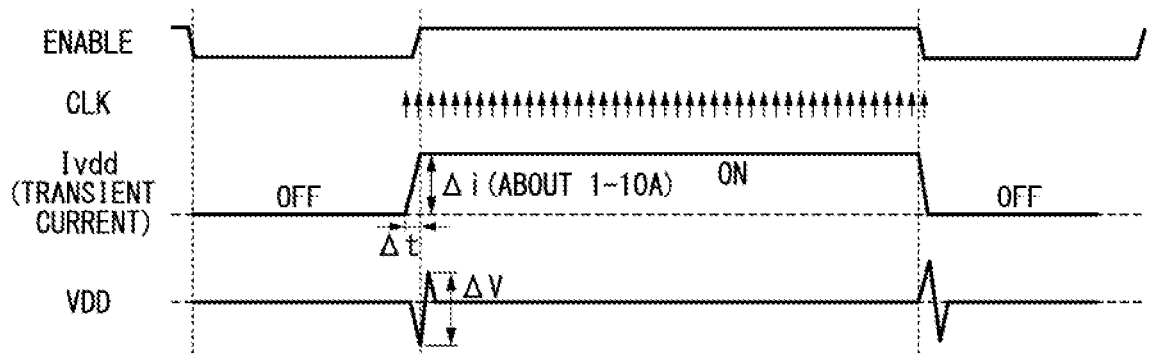
FIG. 16 is a diagram showing an example of voltage fluctuation of LSI when switching from the circuit stopped state to the circuit operating state and from the circuit operating state to the circuit stopped state according to a prior art.
Figure 17:
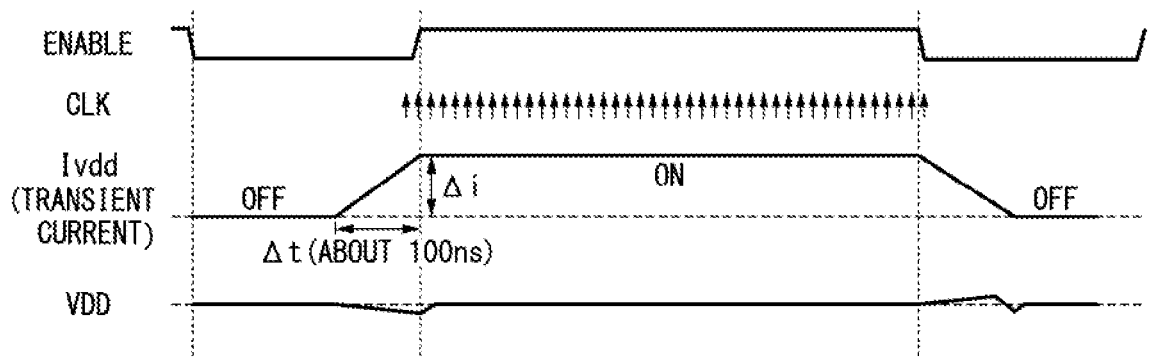
FIG. 17 is a diagram showing an example of voltage fluctuation of an LSI when switching from the circuit stopped state to the circuit operating state and from the circuit operating state to the circuit stopped state after the problems of the prior art are solved.
Figure 18:
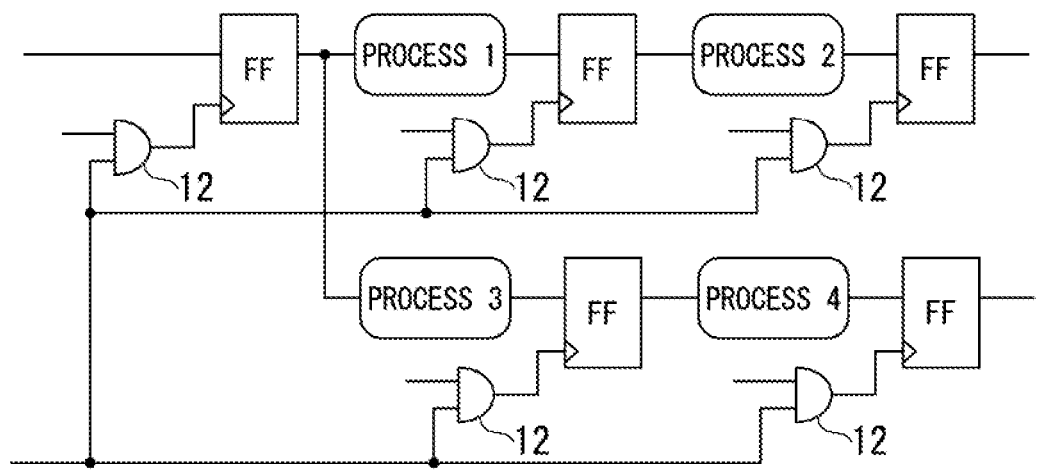
FIG. 18 is a diagram showing clock gating.

An embodiment of the present invention will be described. FIG. 1 is a block diagram showing a configuration of an image sensor and an imaging part in the image processing device according to the embodiment of the present invention. The configuration of the entire image processing device other than the imaging part is the same as the configuration of the general image processing device shown in FIG. 13, and the a description thereof will be omitted.

As shown in FIG. 1, the imaging part 102 of the present embodiment includes an imaging interface part (imaging IF part) 21, an imaging processor 22, a synchronization signal generator 23, and a clock frequency controller (CLK frequency controller) 24, and a data buffer (data Buff) 25.

The imaging IF part 21 reads out the image data (image signal) obtained by the image sensor (imaging element) 1 in synchronization with the image sensor (imaging element) 1 and generates an imaging signal. The imaging processor 22 processes the image image signal from the imaging IF part 21 and transmits it to the image processor 3 via the data bus 7.

In the present embodiment, a data buffer 25 (for example, SRAM) is provided between the imaging IF part 21 and the imaging processor 22 in order to change the data reading speed. That is, the imaging IF part 21 reads out the image data (image signal) obtained by the image sensor (imaging element) 1 in synchronization with the image sensor (imaging element) 1 and writes it in the data buffer 25. The imaging processor 22 reads out the image signal written in the data buffer 25 and performs image processing.

The data (image signal) from the image sensor 1 is input to the imaging part 102 (imaging IF part 21 and synchronization signal generator 23) in synchronization with the horizontal synchronization signal (HSYNC) and the vertical synchronization signal (VSYNC). The synchronization signal generator 23 generates synchronization signals (HSYNC and VSYNC) synchronized with the image sensor (imaging element) 1. The clock frequency controller 24 controls the frequency of the clock CLK according to the synchronization signals (HSYNC and VSYNC). The clock CLK is a clock input to the imaging processor 22.

Figure 2:
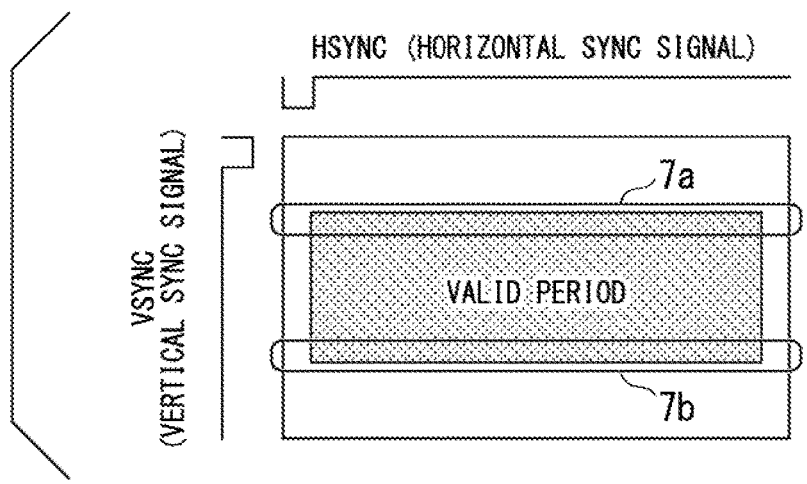
FIG. 2 is a diagram showing a relationship between a synchronization signal (horizontal synchronization signal and vertical synchronization signal) and a valid period.

In order to reduce power consumption, the clock CLK input to the imaging processor 22 is stopped outside the valid period. FIG. 2 is a diagram showing the relationship between the synchronization signal (horizontal synchronization signal and vertical synchronization signal) and the validity period. As shown in FIG. 2, a two-dimensional image is raster-scanned to read an image in the horizontal direction from left to right, and then move the image from top to bottom to read the image. When the reading position enters the valid period, the clock CLK is input to the imaging processor 22.

Figure 3:
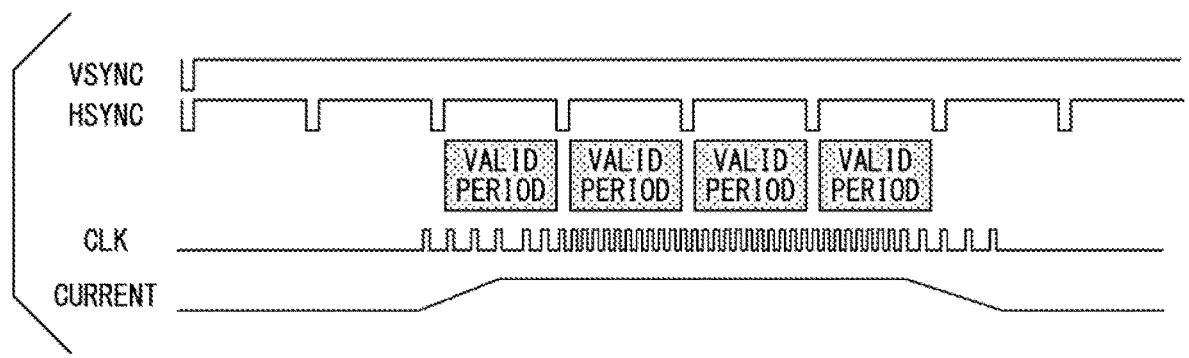
FIG. 3 is a diagram showing a horizontal synchronization signal (HSYNC), a vertical synchronization signal (VSYNC), a clock, and a current fluctuation in FIG. 2.

FIG. 3 is a diagram showing a horizontal synchronization signal (HSYNC), a vertical synchronization signal (VSYNC), a clock CLK, and a current fluctuation in FIG. 2.

In this example, there are valid periods for 4 lines. The clock CLK is stopped outside the valid period (non-valid period).

Here, in the present embodiment, when entering the valid period from the non-valid period, the clock frequency (CLK frequency) is gradually increased near the first line of the valid period (7a in FIG. 2). Then, when entering the non-valid period from the valid period, the clock frequency is gradually reduced near the last line of the valid period (7b in FIG. 2). That is, as shown in FIG. 3, the clock CLK is input shortly before the start of the valid period, and the clock frequency gradually increases in the vicinity of the first line of the valid period. Then, the clock frequency gradually decreases near the last line of the valid period, and the clock CLK stops shortly after entering the non-valid period from the valid period.

In this way, during the valid period, the clock frequency is controlled according to the synchronization signal, and the clock CLK of the portion that processes the data from the image sensor is controlled. That is, the clock is turned on a little before the valid period, and a run-up period is provided after the start of the valid period to increase the clock frequency. Then, an end operation period is provided shortly before the end of the valid period, the clock frequency is made down, and the clock is turned off after the end of the valid period. This prevents the current from fluctuating significantly when switching from the non-valid period to the valid period, and the change in the current becomes gentle.

As described above, in the image processing device of the present embodiment, a data buffer (for example, SRAM) is provided between the imaging interface part and the imaging processor in order to change the data reading speed. Then, the clock frequency (CLK frequency) is controlled during the valid period. By providing the data buffer 25, the image sensor 1 can perform the imaging process at the same timing regardless of the clock CLK input to the imaging processor 22.

Figure 4:
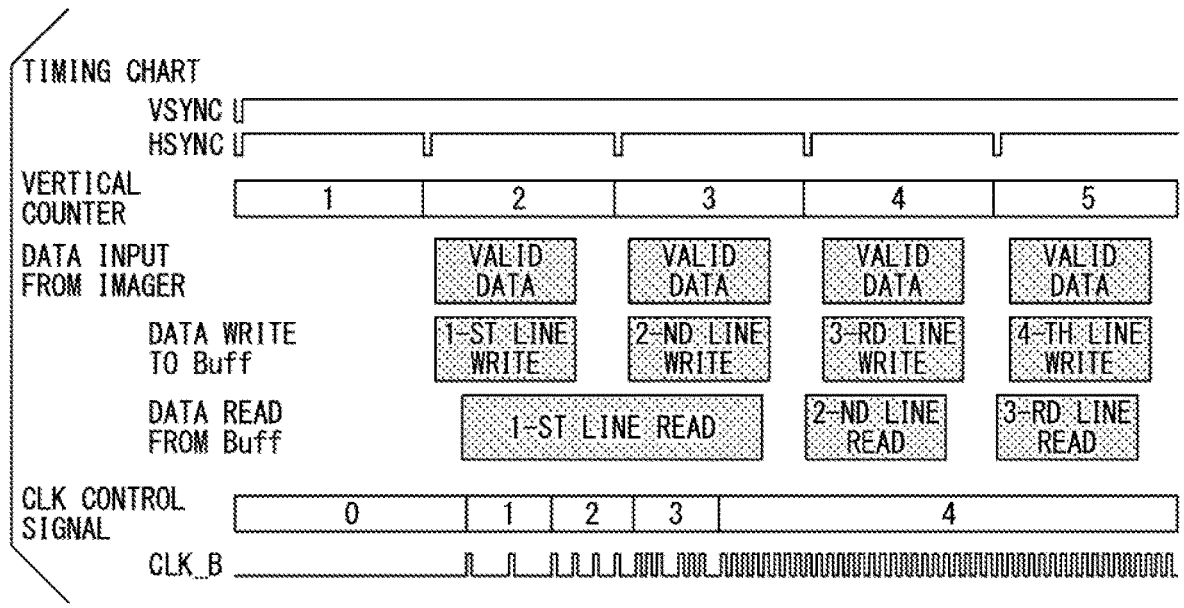
FIG. 4 is a diagram showing an example of a timing chart in the image processing device according to the embodiment of the present invention.

FIG. 4 is a diagram showing an example of a timing chart in the image processing device according to the embodiment of the present invention. The counters (vertical counter and horizontal counter) are operated according to the synchronization signals (VSYNC and HSYNC).

First, the image sensor 1 (imager) reads the data for each line. The imaging part 102 receives data for each line from the image sensor 1 (data input from the imager) and writes it to the data buffer 25 (data writing to Buff). Then, in the example of FIG. 4, the data of the first line is slowly read out over time, and the data of the second and subsequent lines is read out at a normal frequency (data read from Buff).

Figure 5:
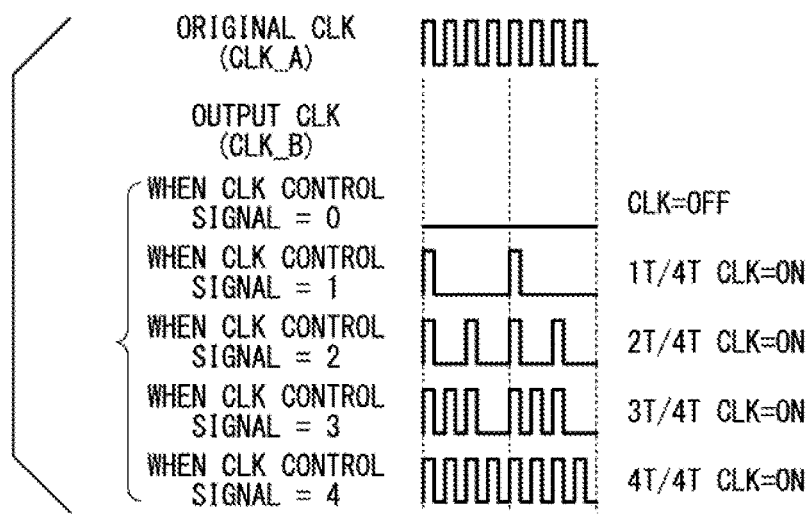
FIG. 5 is a diagram showing a relationship between a clock control signal and a clock after control.

The clock control signal (CLK control signal) controls the clock (generates an output clock). FIG. 5 is a diagram showing the relationship between the clock control signal and the clock after control. As shown in FIG. 5, when the CLK control signal is 0, the output CLK is OFF. When the CLK control signal is 1, the output clock (output CLK) is turned ON at a clock (CLK) once in four times. When the CLK control signal is 2, the output CLK is turned ON at a clock (CLK) twice in four times. When the CLK control signal is 3, the output CLK is turned ON at a clock (CLK) third times in four times. When the CLK control signal is 4, the output CLKs of all CLKs are turned ON. The CLK control signal is 4 during the valid period, and the CLK control signal is 0 during the non-valid period. However, by inserting steps (run-up period) when the CLK control signal is 1, 2 and 3 in the middle, the clock is input slowly.

The control of the clock frequency at the start part of the valid period (operating period), that is, the control when switching from the circuit stopped state (OFF) to the circuit operating state (ON) has been described above, but the same applies to the end part of the valid period (operating period), that is, when switching from the circuit operating state (ON) to the circuit stopped state (OFF).

Figure 6:
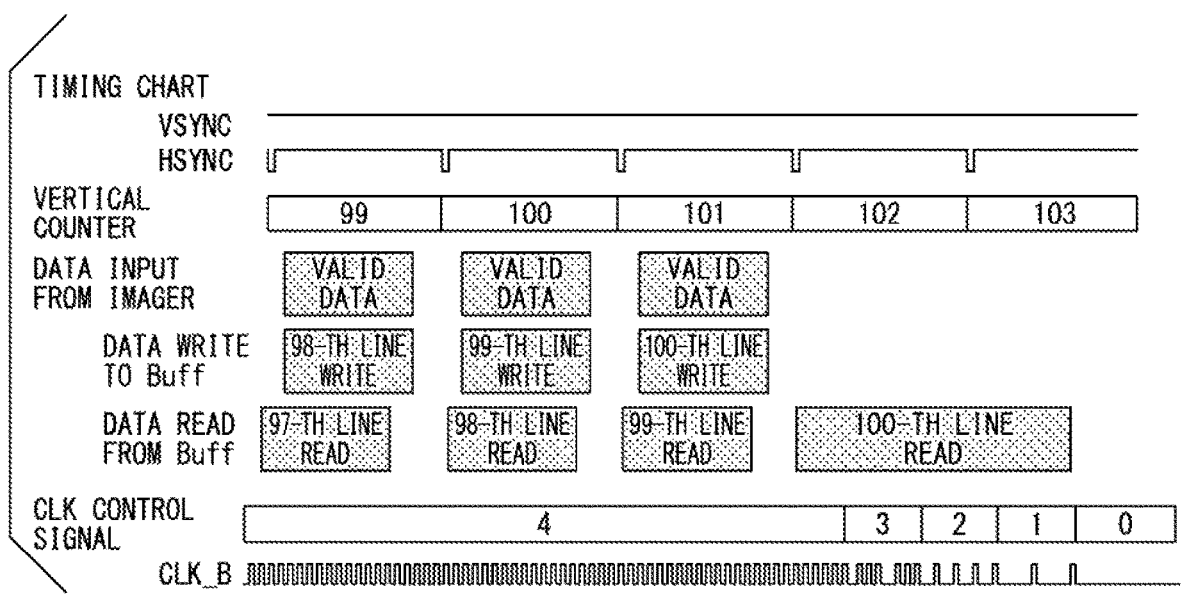
FIG. 6 is a diagram showing an example of a timing chart when the embodiment of the present invention is applied to an end part of a valid period.

FIG. 6 is a diagram showing an example of a timing chart when the present embodiment is applied to the end part of the valid period. In FIG. 6, it is assumed that the image sensor 1 (imager) obtains data for 100 lines. That is, it is assumed that the valid data is 100 lines.

In the example of FIG. 6, the data up to the 99th line is read out at a normal frequency, but the data on the 100th line is read out slowly over time (data reading from Buff). In this way, since the clock frequency is changed according to the synchronization signal, it is possible to reduce a sudden current change (voltage change) at the beginning or end of the valid period.

Figure 7:
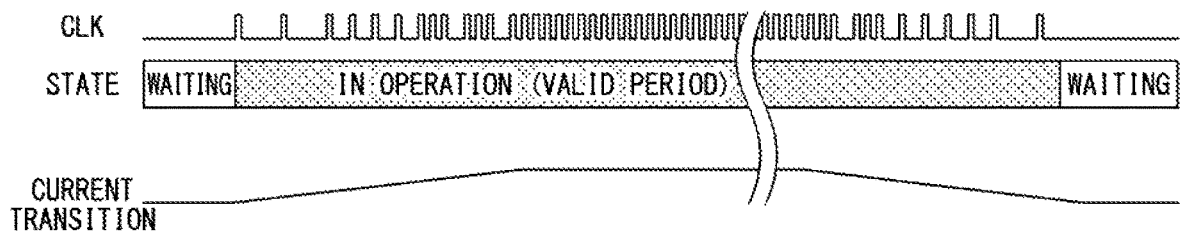
FIG. 7 is a timing chart showing a relationship between a change in clock frequency, a state, and a current transition according to the embodiment of the present invention.

FIG. 7 is a timing chart showing the relationship between the change in clock frequency, the state, and the current transition in the present embodiment. As shown in FIG. 7, the clock frequency is changed during the valid period (during the operating period). In FIG. 7, the start of the clock input coincides with the start of the valid period (during the operating period), but the clock may be input shortly before the start of the valid period. Further, although the end of the clock input coincides with the end of the valid period (during the operating period), the clock may be input until a little after the end of the valid period.

With such a configuration, in the present embodiment, by having a data buffer, the clock frequency can be controlled within the valid period (to be exact, slightly before the valid period). As a result, it is possible to suppress power fluctuations even when clock gating is adopted. That is, since the clock frequency is controlled during the operating period (when the clock gating is open), the current transition can be made gentle even when the clock gating is adopted. Therefore, it is possible to improve the current fluctuation reduction effect near the beginning (or near the end) of the valid period.

Figure 8:
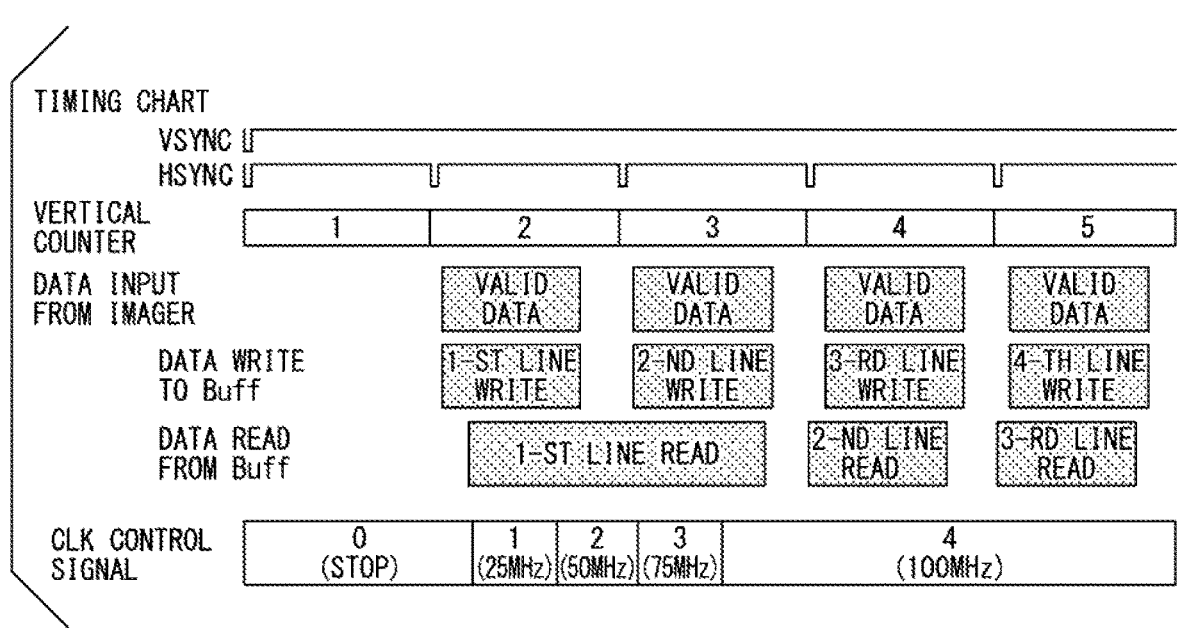
FIG. 8 is a timing chart in the image processing device according to the embodiment of the present invention.

Next, a modified example of this embodiment will be described. FIG. 8 is a timing chart according to the above-described embodiment of the present invention. The only difference from FIG. 4 is how to write the output clock. When the CLK control signal is 0, the output CLK is stopped. When the CLK control signal is 1, the output CLK is 25 MHz. When the CLK control signal is 2, the output CLK is 50 Mhz. When the CLK control signal is 3, the output CLK is 75 MHz. When the CLK control signal is 4, the output CLK is 100 MHz. The CLK control signal is 0 during the non-valid period, but the clock is slowly input by inserting the steps when the CLK control signal is 1, 2, and 3 (run-up period) in the middle.

Figure 9:
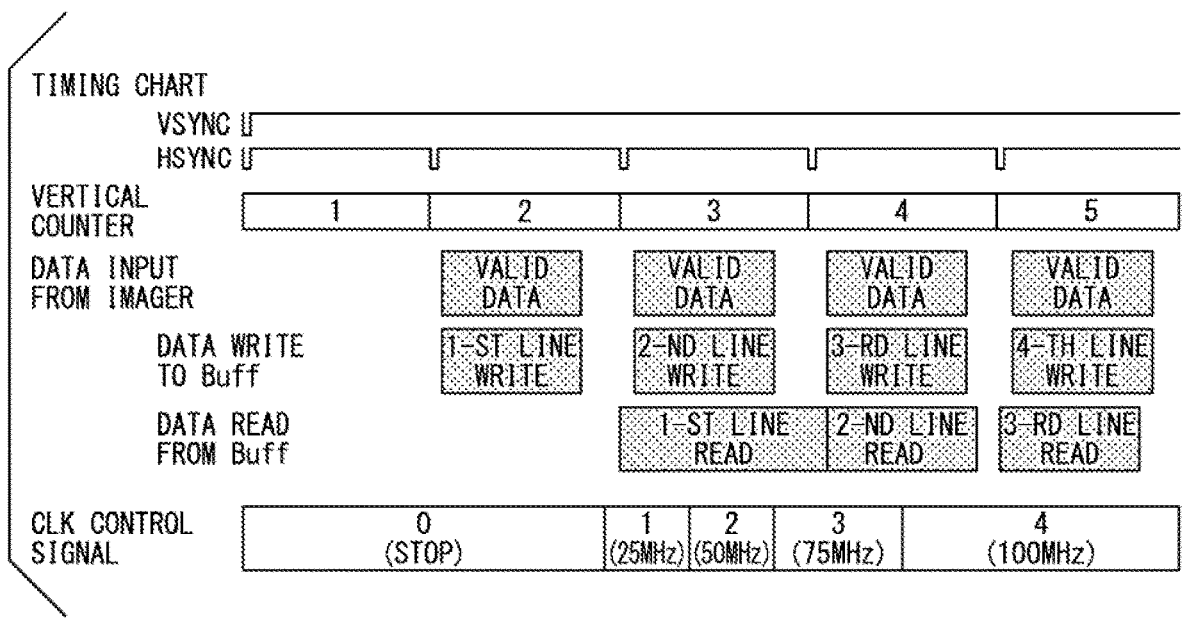
FIG. 9 is a timing chart in the image processing device according to a first modification.

FIG. 9 is a timing chart according to the first modification. In the first modification, the clock is controlled over a plurality of lines. In the example of FIG. 8, the clock frequency was increased in the order of 25 MHz, 50 MHz, 75 MHz, and 100 MHz at the time of reading the first line. In the example of FIG. 9, the clock frequency is increased at the time of reading the first line and at the time of reading the second line. Further, in the example of FIG. 8, the writing and the reading of the first line overlap, but in the example of FIG. 9, the writing and the reading do not overlap in any line. It should be noted that these figures are examples, and the present invention is not limited to the examples of these figures.

Figure 10:
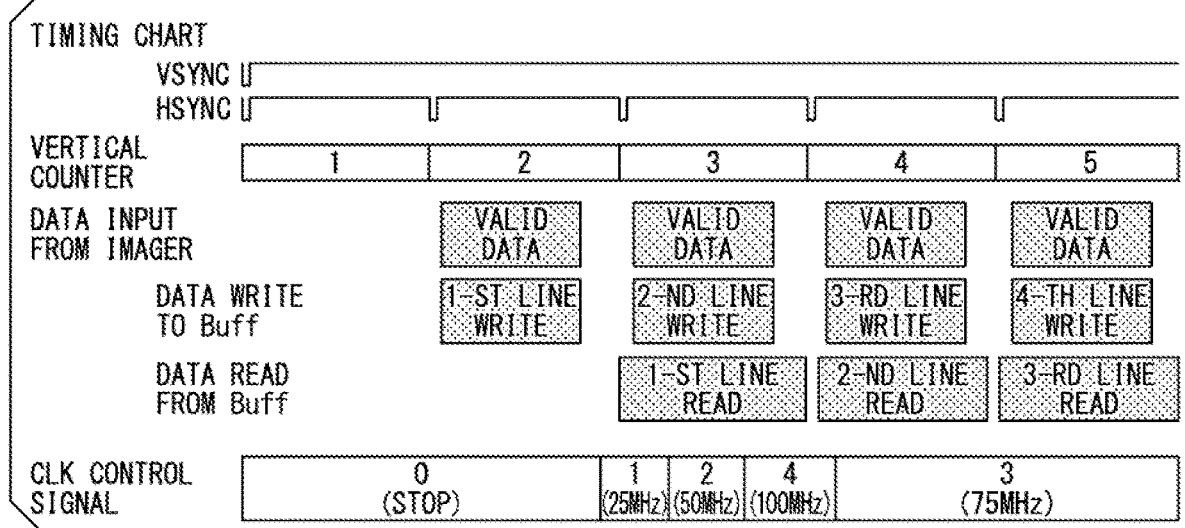
FIG. 10 is a timing chart in the image processing device according to a second modification.

FIG. 10 is a timing chart according to a second modification. In the second modification, the clock frequency is once raised to a frequency higher than the frequency normally operated at the first line. That is, in the first line, the frequency is controlled to change in order of 25 MHz, 50 MHz, and 100 MHz (maximum frequency), and then in the second and subsequent lines, the frequency is 75 MHz (normally operated frequency). That is, in the run-up period, the clock frequency is once increased and then returned to the clock frequency of normal operation. By controlling the clock frequency in this way, it is possible to prevent the reading period of the first line from being extended.

Figure 11:
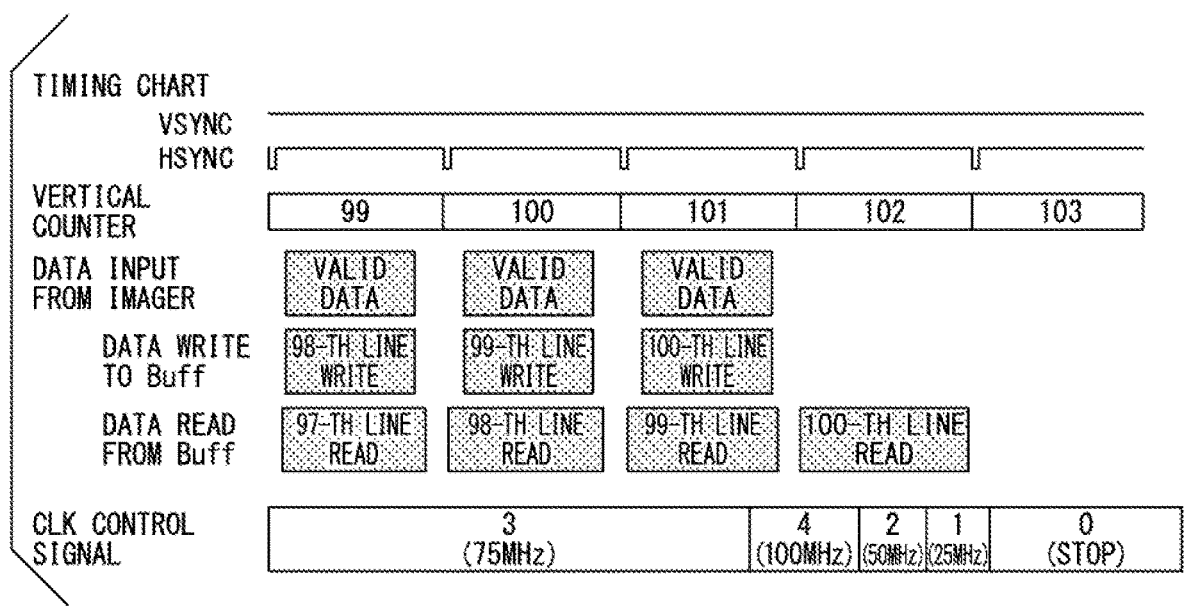
FIG. 11 is a timing chart when the modification 2 is applied to the end part of the valid period.

The above-mentioned modification can also be applied at the end of the valid period (operating period), that is, when switching from the circuit operating state (ON) to the circuit stopped state (OFF). FIG. 11 is a timing chart when the modification 2 is applied to the end part of the valid period. In FIG. 11, it is assumed that the image sensor 1 (imager) obtains data for 100 lines. That is, it is assumed that the valid data is 100 lines.

In the example of FIG. 11, at the time of reading the 99th line, the clock frequency is once raised to a frequency (100 MHz) higher than the frequency (75 MHz) normally operated. That is, in the end operation period, the clock frequency is once increased and then returned to the clock frequency of normal operation. By controlling the clock frequency in this way, it is possible to prevent the reading period of the 100th line from being extended.

As described above, in the embodiment of the present invention, the clock frequency controller 24 gradually changes the clock frequency of the clock input to the imaging processor 22 at the start part of the valid period of the synchronization signal. The clock frequency controller 24 may change the clock frequency stepwise from near the beginning of the valid period of the synchronous signal (a little before), and gradually change the clock frequency until near the end of the valid period of the synchronous signal (a little later).

Further, the clock frequency controller 24 may gradually raise the clock frequency of the clock input to the imaging processor 22 in the run-up period starting shortly before the valid period, and gradually lower the clock frequency during the end operation period that ends shortly after the valid period.

Alternatively, the clock frequency controller 24 may gradually raise the clock frequency of the clock input to the imaging processor 22 in the run-up period starting immediately after the start of the valid period, and gradually lower the clock frequency during the end operation period that ends immediately before the end of the valid period.

Figure 12:
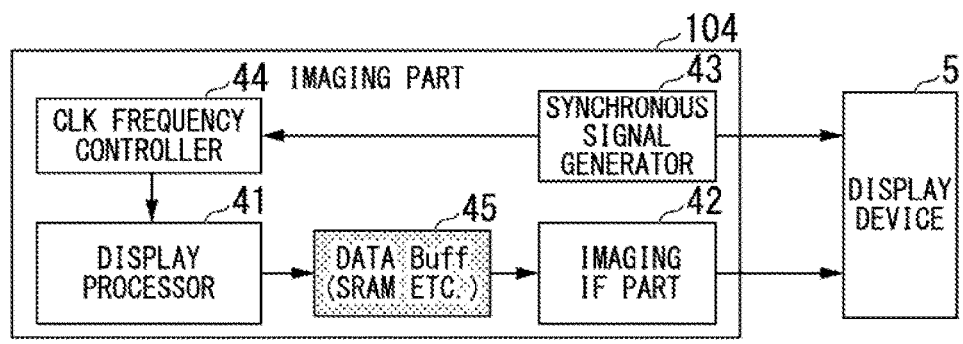
FIG. 12 is a block diagram showing a configuration of a display part when the embodiment of the present invention is applied to output data from the display part to the display device.

Although the input data from the image sensor to the imaging part in the image processing device has been described above as an example, the same technique can be applied to the output data from the display part to the display device. FIG. 12 is a block diagram showing a configuration of the display part 104 when the embodiment of the present invention is applied to output data from the display part 104 to the display device 5. The configuration of the entire image processing device other than the display part is the same as the configuration of the general image processing device shown in FIG. 13, and a description thereof will be omitted.

The display part 104 includes a display processor 41, a display interface part (display IF part) 42, a synchronization signal generator 43, a clock frequency controller (CLK frequency controller) 44, and a data buffer (data buffer) 45.

The display processor 41 reads data, performs image processing, and writes it to the data buffer 45. The display IF part 42 reads the data written in the data buffer 45, generates a display signal, and outputs the display signal to the display device 5. The synchronization signal generator 43 generates a synchronization signal and outputs it to the clock frequency controller 44 and the display device 5.

With such a configuration, the clock frequency controller 44 controls the clock frequency of the clock input to the display processor 41 based on the synchronization signal. Specifically, the clock frequency controller 44 changes the clock frequency after the start of the valid period of the synchronization signal.

The clock frequency controller 44 may increase the clock frequency stepwise after the start of the valid period of the synchronization signal, or may increase the clock frequency once and then decrease it.

Further, the clock frequency controller 44 may change the clock frequency before the end of the valid period of the synchronization signal. At this time, the clock frequency controller 44 may gradually lower the clock frequency before the end of the valid period of the synchronization signal.

As described above, when the embodiment of the present invention is applied to the output data from the display part 104 to the display device 5, in order to change the data reading speed between the display processor 41 and the display IF part 42, it is characterized in that a buffer 45 (for example, SRAM) is provided. By providing the data buffer 45, the display device 5 can perform display at the same timing regardless of the clock CLK input to the display processor 41.

Although one embodiment of the present invention has been described above, the technical scope of the present invention is not limited to the above-described embodiment, and the combination of components can be changed, various changes can be made to each component, and the components can be deleted without departing from the spirit of the present invention.

Each component is showing the function and operation related to each component. One configuration (circuit) may simultaneously realize functions and processes related to a plurality of components.

Each component may be realized by a computer including one or more processors, logic circuits, memories, input/output interfaces, a computer-readable recording medium, and the like, respectively or as a whole. In that case, the above-mentioned various functions and processes may be realized by recording a program for realizing each component or the entire function on a recording medium, reading the recorded program into a computer system, and executing the program.

In this case, for example, the processor is at least one of a CPU, a DSP (Digital Signal Processor), and a GPU (Graphics Processor). For example, the logic circuit is at least one of ASIC (Application Specific Integrated Circuit) and FPGA (Field-Programmable Gate Array).

Further, the "computer system" referred to here may include hardware such as an OS and peripheral devices. Further, the "computer system" includes a homepage providing environment (or a display environment) if a WWW system is used. The "computer-readable recording medium" refers to a storage device including flexible disks, magneto-optical disks, ROMs, writable non-volatile memories such as flash memory, portable media such as CD-ROMs, and hard disks built into computer systems.

Further, the "computer-readable recording medium" also includes those that hold the program for a certain period of time, such as a volatile memory (for example, DRAM (Dynamic Random Access Memory)) inside a computer system that serves as a server or a client when a program is transmitted via a network such as the Internet or a communication line such as a telephone line.

Further, the program may be transmitted from a computer system in which this program is stored in a storage device or the like to another computer system via a transmission medium or by a transmission wave in the transmission medium. Here, the "transmission medium" for transmitting a program refers to a medium having a function of transmitting information, such as a network (communication network) such as the Internet or a communication line (communication line) such as a telephone line. Further, the above program may be for realizing a part of the above-mentioned functions. Further, it may be a so-called difference file (difference program) that realizes the above-mentioned function in combination with a program already recorded in the computer system.

In the present specification, terms indicating directions such as "front, back, top, bottom, right, left, vertical, horizontal, vertical, horizontal, row and column" are used to describe these directions in the device of the present invention. Therefore, these terms used to describe the specification of the present invention should be interpreted relative to each other in the device of the present invention.

The present invention can be widely applied to circuits and devices using LSI, and even when clock gating is adopted, the current transition can be made gentle when switching from the non-valid period to the valid period.

What is claimed is:

1. An image processing device comprising:
   an image sensor;
   a data buffer;
   an imaging interface part configured to read image data from the image sensor, generate an imaging signal, and write the generated imaging signal to the data buffer;
   an imaging processor configured to read out the imaging signal written in the data buffer and perform image processing;
   a synchronization signal generator configured to generate a synchronization signal synchronized with the image sensor; and
   a clock frequency controller configured to control a clock frequency of a clock input to the imaging processor on the basis of the synchronization signal,
   wherein the clock frequency controller is configured to change the clock frequency after a start of a valid period of the synchronization signal.

2. The image processing device according to claim 1, wherein the clock frequency controller is configured to increase the clock frequency stepwise after the start of the valid period of the synchronization signal.

3. The image processing device according to claim 1, wherein the clock frequency controller is configured to once raise the clock frequency and then lower the clock frequency after the start of the valid period of the synchronization signal.

4. The image processing device according to claim 1, wherein the clock frequency controller is configured to change the clock frequency before an end of the valid period of the synchronization signal.

5. The image processing device according to claim 4, wherein the clock frequency controller is configured to gradually lower the clock frequency before the end of the valid period of the synchronization signal.

6. An image processing device comprising:
   a data buffer;
   a display processor configured to read data, perform image processing, and write it to the data buffer;

a display interface part configured to read the data written in the data buffer and generate a display signal; and a synchronization signal generator configured to generate a synchronization signal;

a clock frequency controller configured to control a clock frequency of a clock input to the display processor on the basis of the synchronization signal, wherein the clock frequency controller is configured to change the clock frequency after a start of a valid period of the synchronization signal.

7. The image processing device according to claim 6, wherein the clock frequency controller is configured to increase the clock frequency stepwise after the start of the valid period of the synchronization signal.

8. The image processing device according to claim 6, wherein the clock frequency controller is configured to once raise the clock frequency and then lower the clock frequency after the start of the valid period of the synchronization signal.

9. The image processing device according to claim 6, wherein the clock frequency controller is configured to change the clock frequency before an end of the valid period of the synchronization signal.

10. The image processing device according to claim 9, wherein the clock frequency controller is configured to gradually lower the clock frequency before the end of the valid period of the synchronization signal.

* * * * *